US011275468B2

(12) United States Patent
Yuan (10) Patent No.: US 11,275,468 B2
(45) Date of Patent: Mar. 15, 2022

(54) CAPACITANCE DETECTION CIRCUIT, TOUCH CONTROL CHIP AND ELECTRONIC DEVICE (71) Applicant: SHENZHEN GOODIX TECHNOLOGY CO., LTD., Shenzhen (CN)

(72) Inventor: Guangkai Yuan, Shenzhen (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 2 days.

(21) Appl. No.: 17/121,995

(22) Filed: Dec. 15, 2020

(65) Prior Publication Data
US 2021/0200374 A1 Jul. 1, 2021

Related U.S. Application Data (63) Continuation of application No. PCT/CN2019/128850, filed on Dec. 26, 2019.

(51) Int. Cl.
G06F 3/041 (2006.01)
G06F 3/044 (2006.01)

(52) U.S. Cl.
CPC ............ *G06F 3/0418* (2013.01); *G06F 3/044* (2013.01); *G06F 3/04164* (2019.05)

(58) Field of Classification Search
CPC ..... G06F 3/0418; G06F 3/04164; G06F 3/044
See application file for complete search history.

(56) References Cited

U.S. PATENT DOCUMENTS

| 9,454,304 | B2* | 9/2016 | Hinckley | G06F 1/1641 |
|---|---|---|---|---|
| 10,042,484 | B1* | 8/2018 | O'Connor | G06F 3/04186 |
| 10,142,835 | B2* | 11/2018 | Cotterill | G06F 21/35 |
| 10,204,256 | B2 | 2/2019 | Liu et al. | |
| 2005/0122119 | A1* | 6/2005 | Barlow | G01D 5/24 |
| | | | | 324/662 |
| 2007/0109274 | A1* | 5/2007 | Reynolds | G06F 3/04182 |
| | | | | 345/173 |

(Continued)

FOREIGN PATENT DOCUMENTS

| CN | 104809448 A | 7/2015 |
|---|---|---|
| CN | 105677119 A | 6/2016 |

(Continued)

*Primary Examiner* — Sejoon Ahn (57) ABSTRACT

This application provides a capacitance detection circuit, which is configured to detect a capacitance between a sensing electrode in a screen and a first driving electrode to which a driving signal is input. The capacitance detection circuit includes: an amplification circuit, connected to the sensing electrode and configured to convert a capacitance signal between the sensing electrode and the first driving electrode into a voltage signal; a cancellation circuit, connected to the amplification circuit and configured to output a cancellation signal to the amplification circuit, where the cancellation signal is used to cancel a noise signal from the screen included in the voltage signal; and a control circuit, connected to a second driving electrode, in the screen, to which no driving signal is input, and configured to generate a control signal, where the control signal is configured to control the cancellation circuit to generate the cancellation signal.

20 Claims, 5 Drawing Sheets (56) References Cited

U.S. PATENT DOCUMENTS

| | | | |
|---|---|---|---|
| 2012/0139846 A1* | 6/2012 | Krah | G06F 3/044 |
| | | | 345/173 |
| 2012/0176179 A1* | 7/2012 | Harders | G06F 3/04166 |
| | | | 327/517 |
| 2015/0035787 A1* | 2/2015 | Shahparnia | G06F 3/0418 |
| | | | 345/174 |
| 2017/0075472 A1 | 3/2017 | Min et al. | |
| 2017/0286740 A1 | 10/2017 | Liu et al. | |
| 2018/0032176 A1* | 2/2018 | Krah | G02F 1/13338 |
| 2018/0046325 A1 | 2/2018 | Kim et al. | |
| 2018/0329573 A1 | 11/2018 | Liu et al. | |

FOREIGN PATENT DOCUMENTS

| | | |
|---|---|---|
| CN | 106155435 A | 11/2016 |
| CN | 107368773 A | 11/2017 |

\* cited by examiner

CAPACITANCE DETECTION CIRCUIT, TOUCH CONTROL CHIP AND ELECTRONIC DEVICE

CROSS-REFERENCE TO RELATED APPLICATIONS

This application is a continuation of International Application No. PCT/CN2019/128850, filed on Dec. 26, 2019, the disclosure of which is hereby incorporated by reference in its entirety.

TECHNICAL FIELD

Embodiments of this application relate to the field of capacitance detection, and more particularly, to a capacitance detection circuit, a touch control chip and an electronic device.

BACKGROUND

Capacitive sensors are widely used in electronic products to implement touch detection. When a conductor, such as a finger, approaches or touches a detection electrode, a capacitance corresponding to the detection electrode changes. By detecting a variation of the capacitance, information that the conductor approaches or touches the detection electrode can be acquired, so as to determine operation of a user. However, a noise generated by a screen of the electronic device will affect the foregoing detection result. Therefore, how to reduce the influence of a display screen noise on capacitance detection becomes an urgent problem to be solved.

SUMMARY

Embodiments of this application provide a capacitance detection circuit, a touch control chip and an electronic device, which could reduce the influence of a screen noise on capacitance detection.

In a first aspect, a capacitance detection circuit is provided. The capacitance detection circuit is configured to detect a capacitance between a sensing electrode in a screen of an electronic device and a first driving electrode to which a driving signal is input, where the capacitance detection circuit includes:

an amplification circuit, connected to the sensing electrode and configured to convert a capacitance signal between the sensing electrode and the first driving electrode into a voltage signal, where the voltage signal is associated with the capacitance between the first driving electrode and the sensing electrode;

a cancellation circuit, connected to the amplification circuit and configured to output a cancellation signal to the amplification circuit, where the cancellation signal is used to cancel a noise signal from the screen included in the voltage signal; and a control circuit, connected to a second driving electrode, in the screen, to which no driving signal is input, and configured to generate a control signal, where the control signal is configured to control the cancellation circuit to generate the cancellation signal.

In a possible implementation manner, the cancellation circuit includes a controlled current source, the control signal is a first current signal, the cancellation signal is a second current signal, and the controlled current source is configured to generate the second current signal according to a mirror image of the first current signal.

In a possible implementation manner, the sensing electrode and the controlled current source are connected to a same input end of the amplification circuit; or the sensing electrode and the controlled current source are respectively connected to different input ends of the amplification circuit.

In a possible implementation manner, the cancellation circuit includes an inverter or a buffer, the control signal is a first voltage signal, the cancellation signal is a second voltage signal, and the inverter and the buffer are configured to generate the second voltage signal according to the first voltage signal.

In a possible implementation manner, the cancellation circuit includes the inverter, and the sensing electrode and the inverter are connected to a same input end of the amplifier; or the cancellation circuit includes the buffer, and the sensing electrode and the buffer are respectively connected to different input ends of the amplifier.

In a possible implementation manner, the cancellation circuit further includes a resistor connected in series with the inverter or the buffer, and the resistor is equal to an equivalent resistance between the sensing electrode connected to the amplification circuit and the amplification circuit.

In a possible implementation manner, the control circuit includes a cancellation resistor, one end of the cancellation resistor is connected to the second driving electrode, and the other end of the cancellation resistor is grounded.

In a possible implementation manner, the capacitance detection circuit further includes: a filter circuit, connected to the amplification circuit and configured to perform filtering processing on the voltage signal output by the amplification circuit.

In a possible implementation manner, the capacitance detection circuit further includes: an analog-to-digital conversion circuit, connected to the filter circuit and configured to convert the filtered voltage signal into a digital signal.

In a possible implementation manner, the amplification circuit includes an operational amplifier, and a feedback resistor is connected between an input end and an output end of the operational amplifier.

In a second aspect, a touch control chip is provided. The touch control chip includes the capacitance detection circuit in the first aspect and any one of the possible implementation manners of the first aspect.

In a third aspect, an electronic device is provided. The electronic device includes a screen; and the touch control chip in the second aspect and any one of the possible implementation manners of the second aspect.

Based on the foregoing technical solutions, when a capacitance detection circuit detects a capacitance between a first driving electrode to which a driving signal is input and an sensing electrode, because a control circuit is connected to a second driving electrode, in the screen, to which no driving signal is input, the control circuit can generate a control signal caused by a screen noise. The control signal can be used to control a cancellation circuit to output a cancellation signal matched with the sensing electrode to an amplification circuit connected to the cancellation circuit, to cancel a noise signal that is output from the sensing electrode to the amplification circuit, thereby reducing the influence of the screen noise on capacitance detection.

DESCRIPTION OF EMBODIMENTS

Technical solutions in this application will be described hereinafter with reference to the accompanying drawings.

For a screen of an electronic device, especially a Y-OCTA screen, a display layer of the screen generates a large noise during scanning. The noise affects a touch layer, and it is easy to saturate an amplification circuit in a capacitance detection circuit of the touch layer. If saturation is avoided by reducing magnification of the amplification circuit, an effective detection signal will also be affected, thus reducing the performance of the capacitance detection circuit.

This application provides a capacitance detection circuit, which could reduce the influence of a screen noise on capacitance detection.

Figure 1:
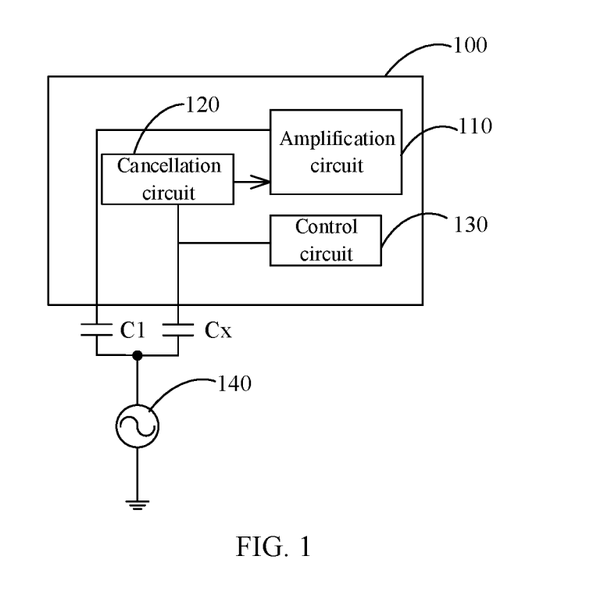
FIG. 1 is a schematic flow chart of a capacitance detection circuit according to an embodiment of this application.

FIG. 1 is a schematic block diagram of a capacitance detection circuit according to an embodiment of this application. The capacitance detection circuit 100 is configured to detect a capacitance between a sensing electrode in a screen of an electronic device and a first driving electrode to which a driving signal is input. As shown in FIG. 1, the capacitance detection circuit 100 includes an amplification circuit 110, a cancellation circuit 120, and a control circuit 130.

The amplification circuit 110 is connected to the sensing electrode and configured to convert a capacitance signal between the sensing electrode and the first driving electrode into a voltage signal, where the voltage signal is associated with the capacitance between the first driving electrode and the sensing electrode.

The cancellation circuit 120 is connected to the amplification circuit 110 and configured to output a cancellation signal to the amplification circuit 110, where the cancellation signal is used to cancel a noise signal from the screen included in the voltage signal.

The control circuit 130 is connected to a second driving electrode, in the screen, to which no driving signal is input, and configured to generate a control signal, where the control signal is configured to control the cancellation circuit 120 to generate the cancellation signal.

A noise source on the screen is shown as 140 in FIG. 1 to FIG. 5.

Since a screen noise is caused by a display cathode, all driving electrodes and sensing electrodes are affected by the same noise.

The capacitance detection circuit 100 currently detects a capacitance between the first driving electrode and a corresponding sensing electrode, and the first driving electrode is a driving electrode to which a driving signal is input. The second driving electrode is a driving electrode to which no driving signal is input. Therefore, a signal generated on the second driving electrode does not include a useful signal, but includes a noise signal generated on the screen. When mutual capacitance detection is performed, each time a driving signal is input to one driving electrode and a detection signal is output from all detection electrodes, while there is no driving signal on other driving electrodes.

In this embodiment, the control circuit 130 is connected to the second driving electrode and the cancellation circuit 120. A control signal generated by the control circuit 130 may control the cancellation circuit 120 to generate a cancellation signal that matches each sensing electrode, so as to cancel a noise signal input to the amplification circuit 110 by each sensing electrode, thereby reducing the influence of the screen noise on capacitance detection.

The control circuit 130 includes, for example, a cancellation resistor, the cancellation resistor is configured to generate a control signal, and the control signal is used to control the cancellation circuit to generate a corresponding cancellation signal. One end of the cancellation resistor is connected to the second driving electrode, and the other end of the cancellation resistor is grounded.

Specifically, the cancellation resistor may be used to match equivalent resistance corresponding to each sensing electrode, namely, the equivalent resistance generated between each sensing electrode connected to an input end of the amplification circuit 110 and the input end of the amplification circuit 110, so that cancellation signal generated by the cancellation circuit matches each sensing electrode.

The cancellation resistance may be, for example, an adjustable resistor. When the capacitance detection circuit 100 is applied to a screen with different noise levels, the cancellation resistor can be adjusted to different resistance values.

The amplification circuit 110 includes an operational amplifier and may further include another device, such as a feedback resistor and/or a feedback capacitor connected between an input end and an output end of the operational amplifier.

The operational amplifier may be, for example, a differential operational amplifier. A feedback resistor and/or a feedback capacitor is connected between a first input end and a first output end of the differential operational amplifier, and a feedback resistor and/or a feedback capacitor is also connected between a second input end and a second output end of the differential operational amplifier.

The first input end, the second input end, the first output end and the second output end of the differential operational amplifier are not limited herein. It is taken as an example for description below that only the first input end is a positive input end, the second input end is a negative input end, the first output end is a negative output end, and the second output end is a positive output end.

The amplification circuit 110 may amplify and output a signal. In this embodiment, the input end of the amplification circuit 110 is connected to the sensing electrode, that is, the input end of the amplification circuit 110 is connected to capacitance to be measured between the sensing electrode and the first driving electrode. The output end of the amplification circuit 110 outputs a voltage signal. The voltage signal is associated with the capacitance to be measured. When the capacitance to be measured changes, the voltage signal output by the amplification circuit 110 also changes. Therefore, variation of the capacitance to be measured can be determined by the voltage signal output by the amplification circuit 110. That is, the amplification circuit 110 can convert a capacitance signal of the capacitance to be measured into a voltage signal, so as to detect the capacitance to be measured.

This embodiment of this application provide two manners to cancel the noise signal, which are separately described as follows with reference to FIG. 2 to FIG. 5. Each amplification circuit in FIG. 2 to FIG. 5 includes a differential operational amplifier. However, this application is not limited thereto, and another type of amplifier may alternatively be applied to the amplification circuit 110 in the embodiments of the application.

Manner 1:

The cancellation circuit 120 includes a controlled current source.

A control signal generated by the control circuit 130 is a first current signal, a cancellation signal generated by the cancellation circuit 120 is a second current signal, and the controlled current source is configured to generate the second current signal according to a mirror image of the first current signal.

Figure 2:
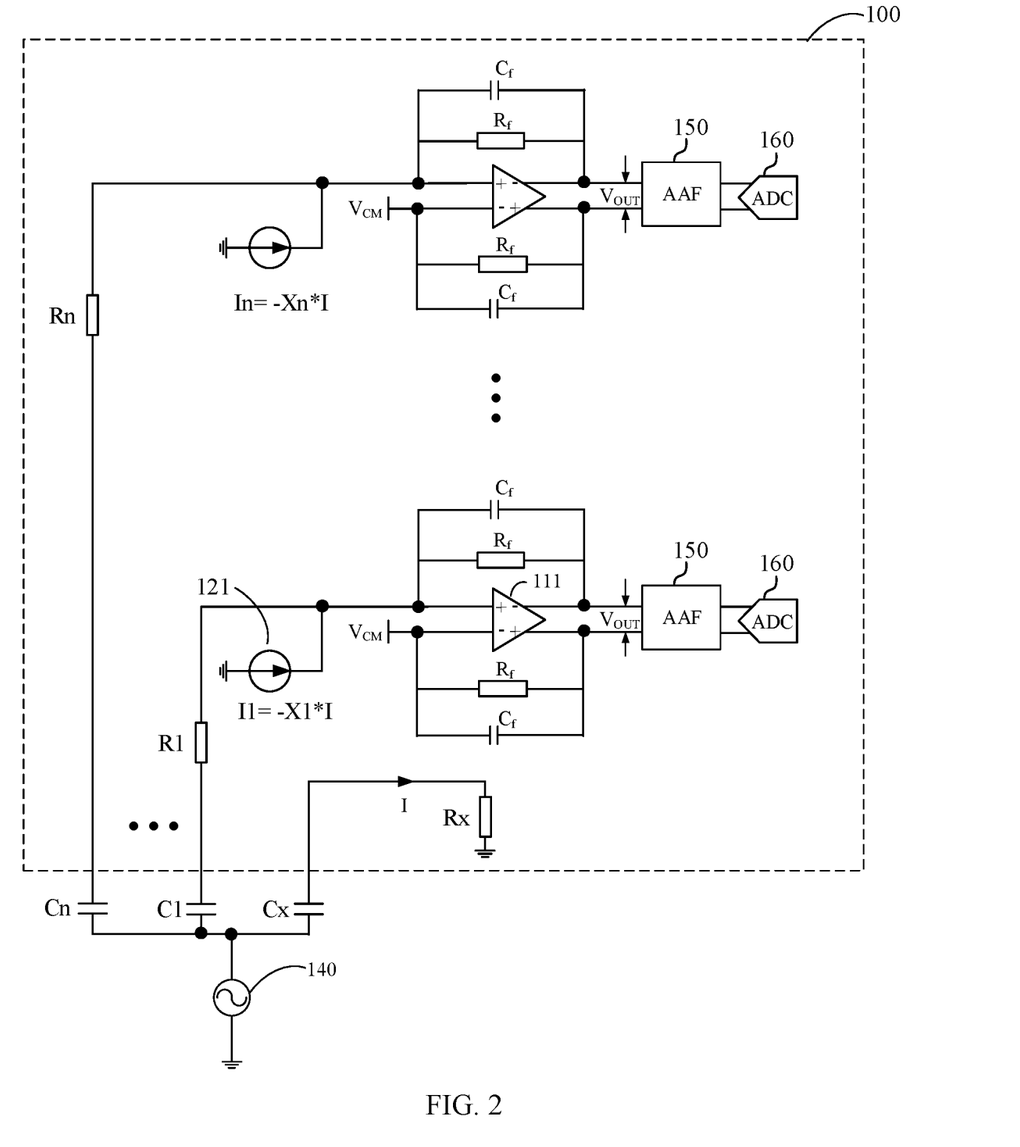
FIG. 2 is a schematic diagram of one possible implementation manner of the capacitance detection circuit shown in FIG. 1.

For example, in a possible implementation manner of the capacitance detection circuit 100 shown in FIG. 2, assuming that a current first driving electrode is detected, a driving signal is input to the first driving electrode, and no driving signal is input to any other driving electrode. In this case, all detection electrodes in a screen respectively generate detection signals, and the detection signals are input into respective connected amplification circuits. The capacitors C1 to Cn shown in FIG. 2 are equivalent capacitances of the detection electrodes (RX) in the screen. Cx is an equivalent capacitances of a driving electrode (TX) that is not currently detected such as the second driving electrode, and R1 to Rn are respectively equivalent resistances corresponded when each detection electrode is connected to an input end of an amplifier 111 in an amplification circuit 110. The other input end of the amplifier 111 is connected to $V_{CM}$. A cancellation circuit corresponding to each detection electrode includes a current source, and the current source is used to generate a matched cancellation signal to cancel a noise signal included in a detection signal output by each detection electrode. Detection of the sensing electrode with equivalent capacitance C1 is described below as an example, and a detection principle of another sensing electrode is similar.

As shown in FIG. 2, the control circuit 130 includes a cancellation resistor Rx. One end of the cancellation resistor Rx is connected to the capacitor Cx and the other end is grounded. The current generated between the cancellation resistor Rx and the capacitor Cx is I. The current source 121 is a controlled current source, and connected to the input of the amplifier 111 and can generate a current I1. The current I1 can be controlled by the current I in a manner such as a current mirror. Specifically, due to the difference in the equivalent capacitance between the driving electrode and the detection electrode, the resistor Rx is used to match the resistance R1. In an S domain, the resistor Rx satisfies the formula: Rx/(1/SCx)=R1/(1/SC1), where S indicates the S domain. If the current on the resistor Rx is I, the current generated by the current source 121 is I1=X1*I, where X1=−C1/Cx. Since the current source 121 and the capacitor C1 are both connected to a same input of the amplifier 111, a coefficient X1 is negative.

When the capacitor C1 is detected, the current I is caused by the screen noise, and the current I1 generated by the current source 121 is controlled by the current I. Therefore, after matching is performed by the coefficient X1, the current I1 is equal to a current signal corresponding to the screen noise on the capacitor C1. The current I1 is used as a cancellation signal and input into the amplification circuit 111 together with a detection signal output from the capacitor C1. Thus, a noise signal in a voltage signal $V_{OUT}$ output by the amplification circuit 111 is substantially cancelled.

It should be understood that the resistor Rx is used to match resistance R1 to resistance Rn. Therefore, a value of the resistor Rx can be determined based on the resistances R1 to Rn. For example, as shown in FIG. 2, if the equivalent capacitances of the respective detection electrodes are equal and the corresponding equivalent resistances of the respective detection electrodes are equal, Rx=Cx*Ri/Ci can be set, where 0<i<n. Further, an output signal of the amplifier 111 can be detected, and the resistor Rx can be continuously fine-tuned based on the detection result until quality of the output signal reaches the optimum.

Figure 3:
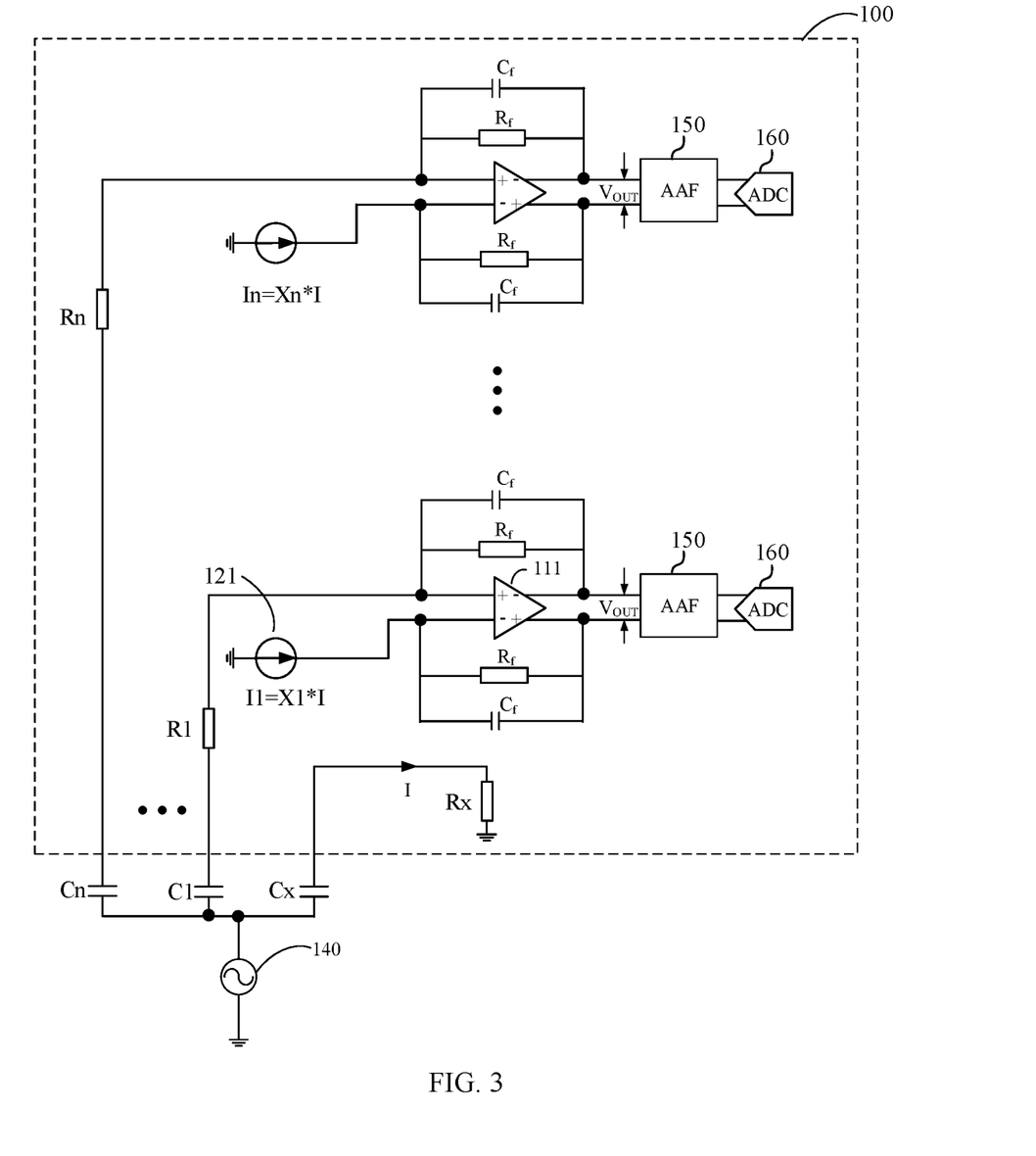
FIG. 3 is a schematic diagram of one possible implementation manner of the capacitance detection circuit shown in FIG. 1.

In FIG. 2, the sensing electrode and the cancellation circuit 120 are connected to a same input of the amplification circuit 110. However, in this embodiment, alternatively, the sensing electrode and the cancellation circuit 120 may be respectively connected to different input ends of the amplification circuit 110. For example, as shown in FIG. 3, the controlled current source 121 and the capacitor C1 are connected to different input ends of the amplifier 111. Since the amplifier 111 is a differential operational amplifier, the coefficient X1 is positive, that is, X1=C1/Cx. The principle of the capacitance detection circuit in FIG. 3 is the same as that of the capacitance detection circuit in FIG. 2. Reference may be made to the foregoing related description for FIG. 2. For brevity, details are not described herein again.

It should be understood that in FIG. 2 and FIG. 3, the current source 121 is a controlled current source, and the current I1 generated by the current source 121 is controlled by the current I caused by a noise, satisfying I1=−X1*I. For example, in specific implementation, a current mirror can be used in FIG. 2 and FIG. 3, and the current source 121 can be a controlled current source through the current mirror. A current mirror circuit is connected between the input end of the amplification circuit and the resistor Rx. The current source 121 may be used as a part of the current mirror circuit. A specific structure of the current mirror circuit is not shown in FIG. 2 or FIG. 3. A structure of a current mirror circuit in the related art can be used. Besides, in addition to use of the current mirror, the current source 121 can become a controlled current source in another manner, which is not limited in this application. Any circuit structure that enables the current I to be associated with the current I1 can be applied in FIG. 2 and FIG. 3.

In manner 1, the screen noise is cancelled by a current cancellation signal, and in manner 2, the screen noise can alternatively be cancelled by a voltage cancellation signal.

Manner 2:

The cancellation circuit 120 includes the inverter or the buffer.

A control signal generated by the control circuit 130 is a first voltage signal, a cancellation signal generated by the cancellation circuit 120 is a second voltage signal, and the inverter and the buffer are configured to generate the second voltage signal according to the first voltage signal.

Optionally, the cancellation circuit 120 further includes a resistor connected in series with the inverter or the buffer, and the resistor is equal to an equivalent resistance generated when the sensing electrode is connected to the amplification circuit 110.

Figure 4:
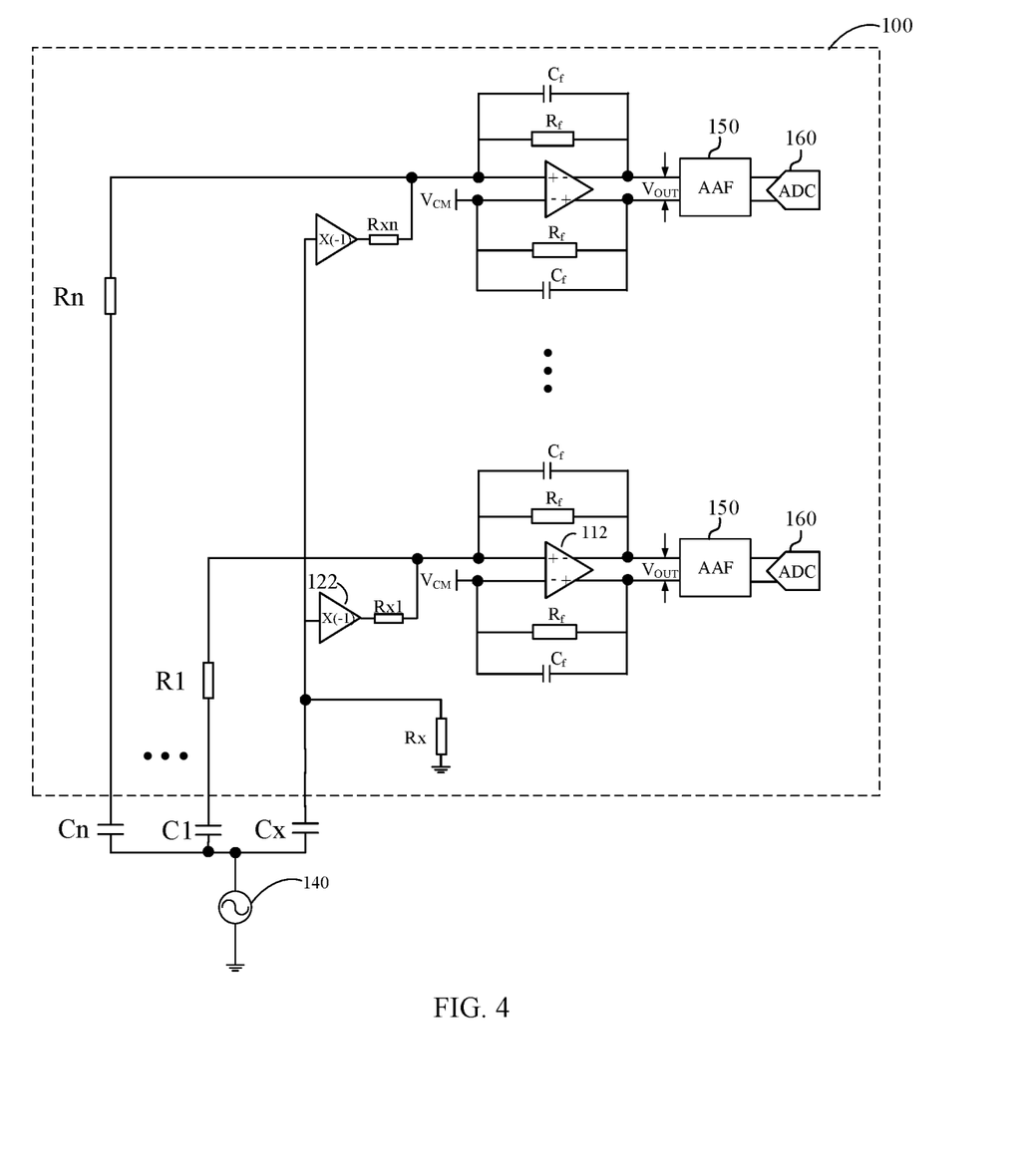
FIG. 4 is a schematic diagram of one possible implementation manner of the capacitance detection circuit shown in FIG. 1.

For example, in a possible implementation manner of the capacitance detection circuit 100 shown in FIG. 4, assuming that a current first driving electrode is detected, a driving signal is input to the first driving electrode, and no driving signal is input to any other driving electrode. In this case, all detection electrodes in a screen respectively generate detection signals, and the detection signals are input into respective connected amplification circuits. The capacitors C1 to Cn shown in FIG. 4 are equivalent capacitances of the detection electrodes (RX) in the screen. Cx is an equivalent capacitance of a driving electrode (TX) that is not currently detected such as the second driving electrode, and R1 to Rn are respectively equivalent resistances corresponded when each detection electrodes is connected to an input end of an amplifier 112 in an amplification circuit 110. The other input end of the amplifier 112 is connected to $V_{CM}$. A cancellation circuit corresponding to each detection electrode includes an inverter and a resistor, and the inverter and the resistor are configured to generate a matched cancellation signal to cancel a noise signal included in a detection signal output by each detection electrode. Detection of the sensing electrode with equivalent capacitance C1 is described below as an example, and a detection principle of another sensing electrode is similar.

As shown in FIG. 4, the control circuit 130 includes a resistor Rx. One end of the resistor Rx is connected to the capacitor Cx and the other end is grounded. A voltage generated on the resistor Rx is V1. A resistor Rx1 is connected in series with the inverter 122. The resistor Rx1 is used to match the resistance R1, and usually set to Rx1=R1. The cancellation circuit 120 can generate an output voltage V2 according to the voltage V1 on the resistor Rx. That is, the voltage V2 varies based on the voltage V1. Specifically, Rx is also used to match R1 and satisfies in an S domain: $Rx/(1/SCx)=R1/(1/SC1)$, where S indicates the S domain. Since the inverter 122 is used, both the inverter 122 and capacitor C1 are connected to a same input end of the amplifier 112.

When the capacitor C1 is detected, the voltage V on the resistor Rx is caused by the screen noise, and the output voltage V1 of the inverter 122 is controlled by the voltage V. Therefore, the voltage V1 is equal to the voltage signal corresponding to the screen noise on the capacitor C1. The voltage V1 is used as a cancellation signal to jointly affect the voltage at the input end of the amplification circuit 111 with the voltage generated by the capacitor C1. Thus, a noise signal in a voltage signal $V_{OUT}$ output by the amplification circuit 111 is substantially cancelled.

Figure 5:
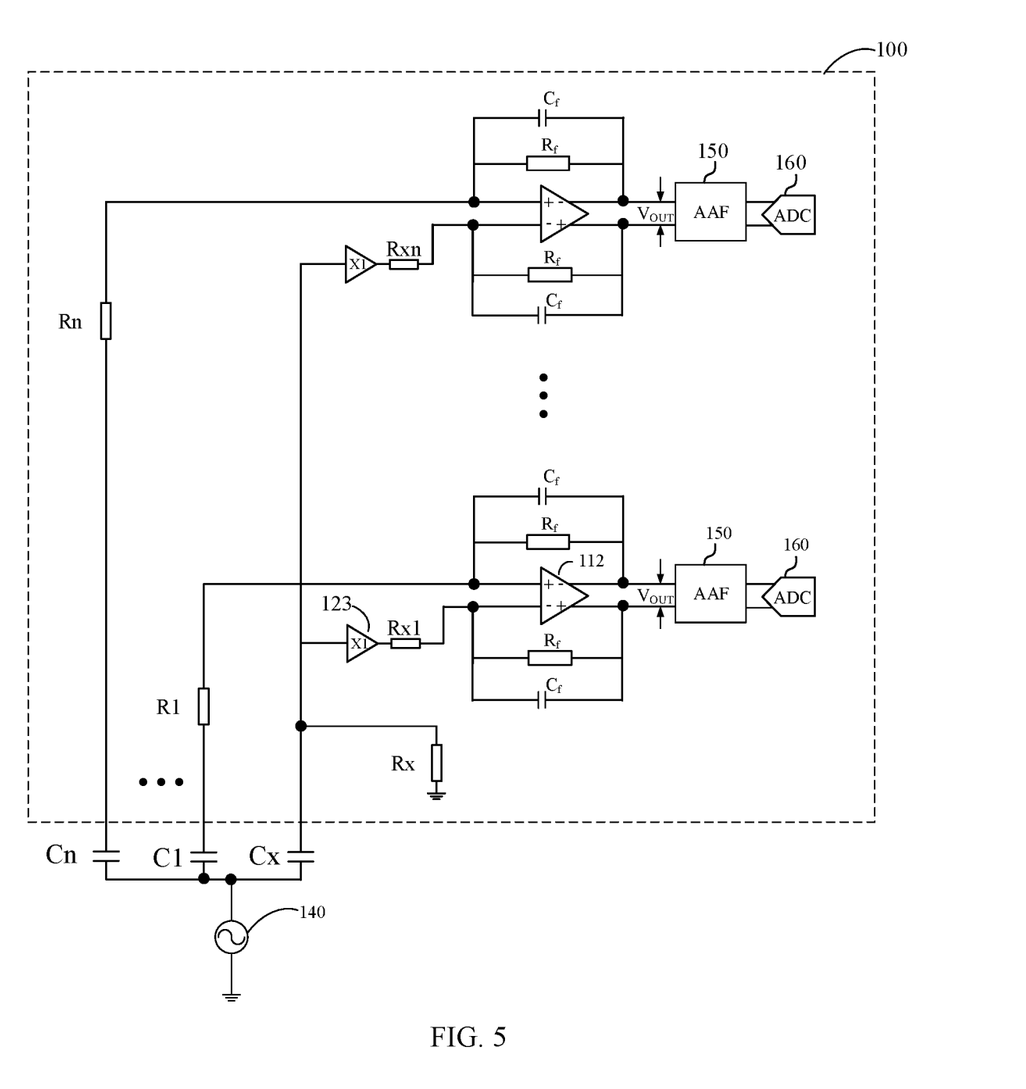
FIG. 5 is a schematic diagram of one possible implementation manner of the capacitance detection circuit shown in FIG. 1.

In FIG. 4, the sensing electrode and the cancellation circuit 120 are connected to a same input of the amplification circuit 110. However, in this embodiment, alternatively, the sensing electrode and the cancellation circuit 120 may be respectively connected to different input ends of the amplification circuit 110. In this case, the foregoing inverter may be replaced with a buffer. For example, as shown in FIG. 5, the inverter 122 shown in FIG. 4 is replaced with a buffer 123, and the buffer 123 and the capacitor C1 are respectively connected to different input ends of the amplifier 112. It should be understood that the buffer 123 and the inverter 122 play a same role in the cancellation circuit, but the inverter 122 can also invert a voltage signal output by the inverter 122. The principle of the capacitance detection circuit in FIG. 5 is the same as that of the capacitance detection circuit in FIG. 4. Reference may be made to the foregoing related description for FIG. 4. For brevity, details are not described herein again.

Optionally, for example, as shown in FIG. 2 to FIG. 5, the capacitance detection circuit 100 may further include:

a filter circuit 150, connected to the amplification circuit 110 and configured to perform filtering processing on the voltage signal output by the amplification circuit 110; and/or a sampling circuit 160, connected to the filter circuit 150 and configured to convert the voltage signal into a digital signal.

The filter circuit 150 may be, for example, an analog antialiasing filter (AAF) with a low-pass characteristic, which can avoid a high-frequency signal or noise aliasing into the sampling circuit 160. The sampling circuit 160 is, for example, an analog-to-digital converter (ADC) circuit, and configured to convert a voltage signal into a digital signal, so that a digital system can process the voltage signal.

It can be seen that when a capacitance detection circuit detects a capacitance between a first driving electrode to which a driving signal is input and an sensing electrode, because a control circuit is connected to a second driving electrode, in the screen, to which no driving signal is input, the control circuit can generate a control signal caused by a screen noise. The control signal can be used to control a cancellation circuit to output a cancellation signal matched with the sensing electrode to an amplification circuit connected to the cancellation circuit, to cancel a noise signal that is output from the sensing electrode to the amplification circuit, thereby reducing the influence of the screen noise on capacitance detection.

An embodiment of this application further provides a touch control chip, and the touch control chip includes the capacitance detection circuit in the foregoing various embodiments of this application.

An embodiment of this application further provides an electronic device, and the electronic device includes a screen; and the touch control chip in the foregoing various embodiments of this application.

By way of example and not limitation, the electronic device in the embodiment of this application may be a portable or mobile computing device such as a terminal device, a mobile phone, a tablet computer, a notebook computer, a desktop computer, a gaming device, an in-vehicle electronic device or a wearable smart device, or may be another electronic device such as an electronic database, an automobile or an automated teller machine (ATM). The wearable smart device includes a device that is full-featured and large-sized and can realize complete or partial functions without relying on a smart phone, such as a smart watch or smart glasses, and a device that only focuses on a certain type of application function, and shall be used in cooperation with such other device as a smart phone, such as various types of smart bracelets, smart jewelry and other devices for physical sign monitoring.

It should be noted that, under a premise of no conflict, various embodiments and/or technical features in the various embodiments described in this application may be combined with each other arbitrarily, and the technical solutions obtained after the combination should also fall within the protection scope of this application.

It should be understood that specific examples in the embodiments of this application are just for helping those skilled in the art better understand the embodiments of this application, rather than for limiting the protect scope of the embodiments of this application. Those skilled in the art may make various improvements and variations on the basis of the foregoing embodiments, and the improvements or variations fall within the protection scope of this application.

The foregoing descriptions are merely specific implementation manners of this application, but are not intended to limit the protection scope of this application. Any variation or replacement readily figured out by a person skilled in the art within the technical scope disclosed in this application shall fall within the protection scope of this application. Therefore, the protection scope of claims should prevail over the protection scope of this application.

What is claimed is:

1. A capacitance detection circuit, configured to detect capacitance between plurality of driving electrodes and plurality of sensing electrodes in a screen of an electronic device, wherein when detects a capacitance between each sensing electrode and a first driving electrode of the plurality of driving electrodes, a driving signal is only input to the first driving electrode, while no driving signal is input to other driving electrodes;

the capacitance detection circuit comprises:
an amplification circuit, connected to the plurality of sensing electrodes and configured to convert a capacitance signal between each sensing electrode and the first driving electrode into a voltage signal, wherein the voltage signal is associated with the capacitance between the first driving electrode and the each sensing electrode;
a cancellation circuit, connected to the amplification circuit and configured to output a cancellation signal to the amplification circuit, wherein the cancellation signal is used to cancel a noise signal from the screen comprised in the voltage signal; and
a control circuit, connected to a second driving electrode, to which no driving signal is input, and configured to generate a control signal, wherein the control signal is configured to control the cancellation circuit to generate the cancellation signal.

2. The capacitance detection circuit according to claim 1, wherein the cancellation circuit comprises a controlled current source, the control signal is a first current signal, the cancellation signal is a second current signal, and the controlled current source is configured to generate the second current signal according to a mirror image of the first current signal.

3. The capacitance detection circuit according to claim 2, wherein the sensing electrode and the controlled current source are connected to a same input end of the amplification circuit; or the sensing electrode and the controlled current source are respectively connected to different input ends of the amplification circuit.

4. The capacitance detection circuit according to claim 1, wherein the cancellation circuit comprises an inverter or a buffer, the control signal is a first voltage signal, the cancellation signal is a second voltage signal, and the inverter and the buffer are configured to generate the second voltage signal according to the first voltage signal.

5. The capacitance detection circuit according to claim 4, wherein
the cancellation circuit comprises the inverter, and the sensing electrode and the inverter are connected to a same input end of the amplification circuit; or
the cancellation circuit comprises the buffer, and the sensing electrode and the buffer are respectively connected to different input ends of the amplification circuit.

6. The capacitance detection circuit according to claim 5, wherein the cancellation circuit further comprises a resistor connected in series with the inverter or the buffer, and the resistor is equal to an equivalent resistance between the sensing electrode connected to the amplification circuit and the amplification circuit.

7. The capacitance detection circuit according to claim 1, wherein the control circuit comprises a cancellation resistor, one end of the cancellation resistor is connected to the second driving electrode, and the other end of the cancellation resistor is grounded.

8. The capacitance detection circuit according to claim 1, wherein the capacitance detection circuit further comprises:
a filter circuit, connected to the amplification circuit and configured to perform filtering processing on the voltage signal output by the amplification circuit.

9. The capacitance detection circuit according to claim 8, wherein the capacitance detection circuit further comprises:
an analog-to-digital conversion circuit, connected to the filter circuit and configured to convert the filtered voltage signal into a digital signal.

10. The capacitance detection circuit according to claim 1, wherein the amplification circuit comprises an operational amplifier, and a feedback resistor is connected between an input end and an output end of the operational amplifier.

11. A touch control chip, comprising a capacitance detection circuit configured to detect capacitance between plurality of driving electrodes and plurality of sensing electrodes in a screen of an electronic device, wherein when detects a capacitance between each sensing electrode and a first driving electrode of the plurality of driving electrodes, a driving signal is only input to the first driving electrode, while no driving signal is input to other driving electrodes;

the capacitance detection circuit comprises:
an amplification circuit, connected to the plurality of sensing electrode and configured to convert a capacitance signal between each sensing electrode and the first driving electrode into a voltage signal, wherein the voltage signal is associated with the capacitance between the first driving electrode and the each sensing electrode;
a cancellation circuit, connected to the amplification circuit and configured to output a cancellation signal to the amplification circuit, wherein the cancellation signal is used to cancel a noise signal from the screen comprised in the voltage signal; and
a control circuit, connected to a second driving electrode, to which no driving signal is input, and configured to generate a control signal, wherein the control signal is configured to control the cancellation circuit to generate the cancellation signal.

12. The touch control chip according to claim 11, wherein the cancellation circuit comprises a controlled current source, the control signal is a first current signal, the cancellation signal is a second current signal, and the controlled current source is configured to generate the second current signal according to a mirror image of the first current signal.

13. The touch control chip according to claim 12, wherein the sensing electrode and the controlled current source are connected to a same input end of the amplification circuit; or the sensing electrode and the controlled current source are respectively connected to different input ends of the amplification circuit.

14. The touch control chip according to claim 11, wherein the cancellation circuit comprises an inverter or a buffer, the control signal is a first voltage signal, the cancellation signal is a second voltage signal, and the inverter and the buffer are configured to generate the second voltage signal according to the first voltage signal.

15. The touch control chip according to claim 14, wherein
the cancellation circuit comprises the inverter, and the sensing electrode and the inverter are connected to a same input end of the amplification circuit; or
the cancellation circuit comprises the buffer, and the sensing electrode and the buffer are respectively connected to different input ends of the amplification circuit.

16. The touch control chip according to claim 15, wherein the cancellation circuit further comprises a resistor connected in series with the inverter or the buffer, and the resistor is equal to an equivalent resistance between the sensing electrode connected to the amplification circuit and the amplification circuit.

17. The touch control chip according to claim 11, wherein the control circuit comprises a cancellation resistor, one end of the cancellation resistor is connected to the second driving electrode, and the other end of the cancellation resistor is grounded.

18. The touch control chip according to claim 11, wherein the capacitance detection circuit further comprises:
a filter circuit, connected to the amplification circuit and configured to perform filtering processing on the voltage signal output by the amplification circuit; and
an analog-to-digital conversion circuit, connected to the filter circuit and configured to convert the filtered voltage signal into a digital signal.

19. The touch control chip according to claim 11, wherein the amplification circuit comprises an operational amplifier, and a feedback resistor is connected between an input end and an output end of the operational amplifier.

20. An electronic device, comprising:
a screen; and
a touch control chip comprising a capacitance detection circuit, wherein the capacitance detection circuit is configured to detect capacitance between plurality of driving electrodes and plurality of sensing electrodes in a screen of an electronic device, and when detects a capacitance between each sensing electrode and a first driving electrode of the plurality of driving electrodes, a driving signal is only input to the first driving electrode, while no driving signal is input to other driving electrodes;
the capacitance detection circuit comprises:
an amplification circuit, connected to the plurality of sensing electrodes and configured to convert a capacitance signal between each sensing electrode and the first driving electrode into a voltage signal, wherein the voltage signal is associated with the capacitance between the first driving electrode and the each sensing electrode;
a cancellation circuit, connected to the amplification circuit and configured to output a cancellation signal to the amplification circuit, wherein the cancellation signal is used to cancel a noise signal from the screen comprised in the voltage signal; and
a control circuit, connected to a second driving electrode, to which no driving signal is input, and configured to generate a control signal, wherein the control signal is configured to control the cancellation circuit to generate the cancellation signal.

* * * * *